No. 789,485.  
Patented May 9, 1905.

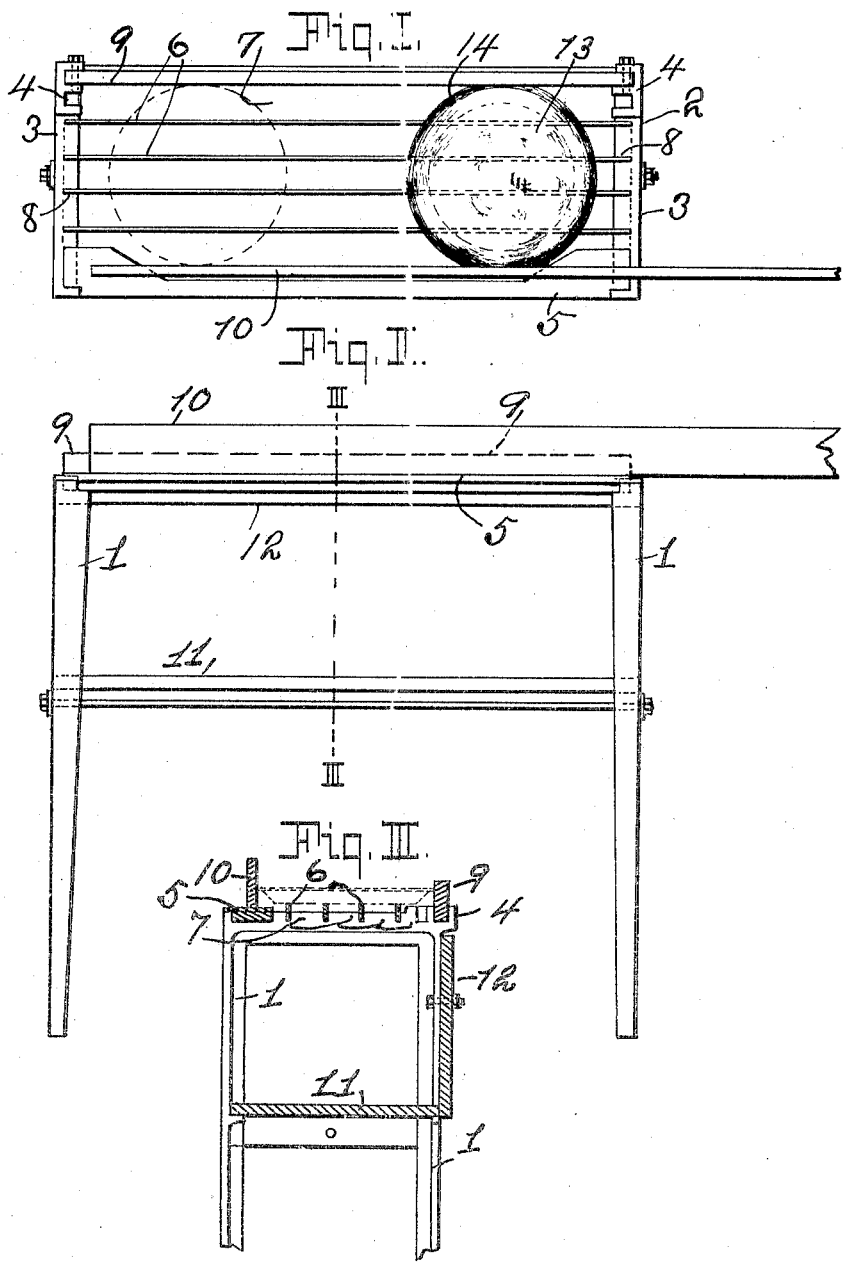

UNITED STATES PATENT OFFICE.

WILLIAM C. BURRY, OF ALLEGHENY, PENNSYLVANIA.

DOUGH-TRIMMER.

SPECIFICATION forming part of Letters Patent No. 789,485, dated May 9, 1905.

Application filed April 15, 1904. Serial No. 203,387.

*To all whom it may concern:*

Be it known that I, WILLIAM C. BURRY, a citizen of the United States, residing at Allegheny, in the county of Allegheny and State of Pennsylvania, have invented or discovered new and useful Improvements in Dough-Trimmers, of which the following is a specification.

In the accompanying drawings, Figure I is a top plan view of my dough-trimmer. Fig. II is a side elevation, and Fig. III is a vertical section on line III III of Fig. II.

This invention relates generally to the art of trimming dough, and more particularly to the trimming off of the overhanging edge of dough surrounding the rim of a pie-plate and before the pie is placed in the oven to bake.

In large bakeries it is customary to expedite the handling of pies as fast as possible, and the machines now in use for trimming the surplus dough from the edge of the pie-plates are both cumbersome and expensive. My device is simple, inexpensive, and easy to handle, besides the dough is not stretched from the plate in the cutting off of the surplus, but retains its shape more evenly than those trimmed by machines now in use.

Reference being had to the drawings, 1 represents a support for the top 2, which top is preferably composed of the end supports 3 3, carrying the slotted gages 4 4 and the working board 5.

6 6 represent flat strips extending across the opening 7 and are set on their edges in slots 8 8 of the end supports 3 3.

9 is a flat bar set on its edge and secured in two of the slots of gages 4 4.

10 is a strip used in applying pressure on the rim of a pie-plate.

11 is a shelf or receptacle having a back board 12 and is supported by the supports 1 1.

13 represents a pie-plate with the surplus dough 14 partly cut away from the edge of the rim of the plate.

In the operation of my invention the pie-plate 13, with the surplus dough extending over its rim, is placed on the strips 6 6. Strip 10 is then pressed against a portion of the edge of the rim of the plate, which forces the plate toward the vertical side of the bar 9 and against which a portion of the edge of the rim bears. The dough on the edge of the rim is squeezed against both the strip 10, held by the operator, and bar 9, until it is severed at those points from the edge of the rim of the plate. The operator then moves the strip 10 toward the left, while still maintaining the pressure on the edge of the rim, which causes the plate 13 to travel along the strips 6 6 toward the left in the drawings and revolve. The revolving of the plate 13 between the vertical sides of the stationary bar 9 and the moving strip 10 while a pressure is bearing against the rim at those points causes the dough to be squeezed and severed from the edge of the rim. As will be noted from the drawings, a half-revolution of the plate will trim the dough from the edge for the moving strip 10 and the stationary bar 9 squeeze against the vertical edge of the rim opposite to each other, and each cuts away half of the dough from the periphery of the rim of the revolving plate. The surplus dough as it is cut away falls through the opening 7 and onto the shelf 11. If desired, the bar 9 can be adjusted to suit smaller size plates or the strip 6 nearest the working board 5 can be removed. In either event the same results would be obtained. The shelf 11 could be on an incline to aid the falling dough to pass from under the supports 1 1, or an endless conveyer could pass beneath the opening for that purpose.

It is evident that many modifications may be made without departing from the spirit of my invention.

What I claim is—

1. In a dough-trimmer, a supporting-frame, a central opening therein, a plurality of separated plate-supporters extending across said opening, a stationary member and a movable member, said members adapted to bear against and trim the surplus dough from the peripheral edge of the rim of a revolving plate.

2. In a dough-trimmer, a supporting-frame having a central opening therein, a plurality of separated plate-supporters extending across said opening, a stationary member capable of adjustment and a movable member, said member adapted to bear against and trim the surplus dough from the peripheral edge of the rim of a revolving plate.

3. In a dough-trimmer, a supporting-frame having a central opening therein, a plurality of separated plate-supporters extending across said opening, a receptacle below said opening, a stationary member and a movable member, said members adapted to bear against and trim the surplus dough from the peripheral edge of the rim of a revolving plate.

WILLIAM C. BURRY.

Witnesses:
W. H. STERRITT,
W. L. BURRY.